US006943339B2

(12) United States Patent
Figueria et al.

(10) Patent No.: US 6,943,339 B2
(45) Date of Patent: Sep. 13, 2005

(54) TILT SENSOR AND METHOD OF MAKING SAME

(75) Inventors: Robert Figueria, San Jose, CA (US); Thomas Pinto, San Jose, CA (US)

(73) Assignee: Vishay Infrared Components, Inc., Santa Clara, CA (US)

( * ) Notice: Subject to any disclaimer, the term of this patent is extended or adjusted under 35 U.S.C. 154(b) by 158 days.

(21) Appl. No.: 10/210,170

(22) Filed: Aug. 1, 2002

(65) Prior Publication Data

US 2004/0021099 A1 Feb. 5, 2004

(51) Int. Cl.[7] ................................................. G01C 1/00
(52) U.S. Cl. .................... 250/222.1; 250/239; 356/147; 356/139.03
(58) Field of Search .................. 250/231.1, 231.12, 250/559.29, 559.32, 239, 216, 221, 222.1; 356/510, 139.1, 138, 147, 139.03; 200/61.45 R, 61.52, DIG. 29; 33/366.11, 366.23, 366.16; 73/514.19, 514.26

(56) References Cited

U.S. PATENT DOCUMENTS

| | | | | | |
|---|---|---|---|---|---|
| 4,972,595 | A | * | 11/1990 | Shimamura et al. | 33/366.23 |
| 5,373,153 | A | * | 12/1994 | Cumberledge et al. | 250/231.1 |
| 5,410,113 | A | | 4/1995 | Mielke | |
| 6,011,254 | A | * | 1/2000 | Sano et al. | 250/231.1 |
| 6,392,223 | B1 | * | 5/2002 | Hjertman et al. | 250/231.1 |
| 6,559,396 | B1 | * | 5/2003 | Chou | 200/61.52 |

FOREIGN PATENT DOCUMENTS

| | | |
|---|---|---|
| JP | 06074766 | 3/1994 |
| JP | 11014350 | 1/1999 |

OTHER PUBLICATIONS

06074766 Japanese Abstract, copyrighted 1994.
11014350 Japanese Abstract, copyrighted 1999.

\* cited by examiner

Primary Examiner—David Porta
Assistant Examiner—Stephen Yam
(74) Attorney, Agent, or Firm—McKee Voorhees & Sease, P.L.C.

(57) ABSTRACT

An apparatus and method of making the same for sensing inclination. The apparatus includes a member moveably positioned in a body, the member moves in response to gravity between two positions if the body is rotated relative to an axis exceeding a certain amount. A detector can be used to detect when the member moves and can automatically report rotation. A method of making an inclinometer includes creating the body by laminating layers, where a layer is prefabricated to include an appropriate cut-out to guide the member between the two positions. Another layer or layers can include the detector. An aspect of the invention comprises having each layer include prefabricated features for multiple inclinometers, and then superposing the prefabricated layers, activating adhesive between them to form a lamination defining a plurality of inclinometers, and then separating the lamination into individual inclinometers.

16 Claims, 16 Drawing Sheets

Orientation For Use

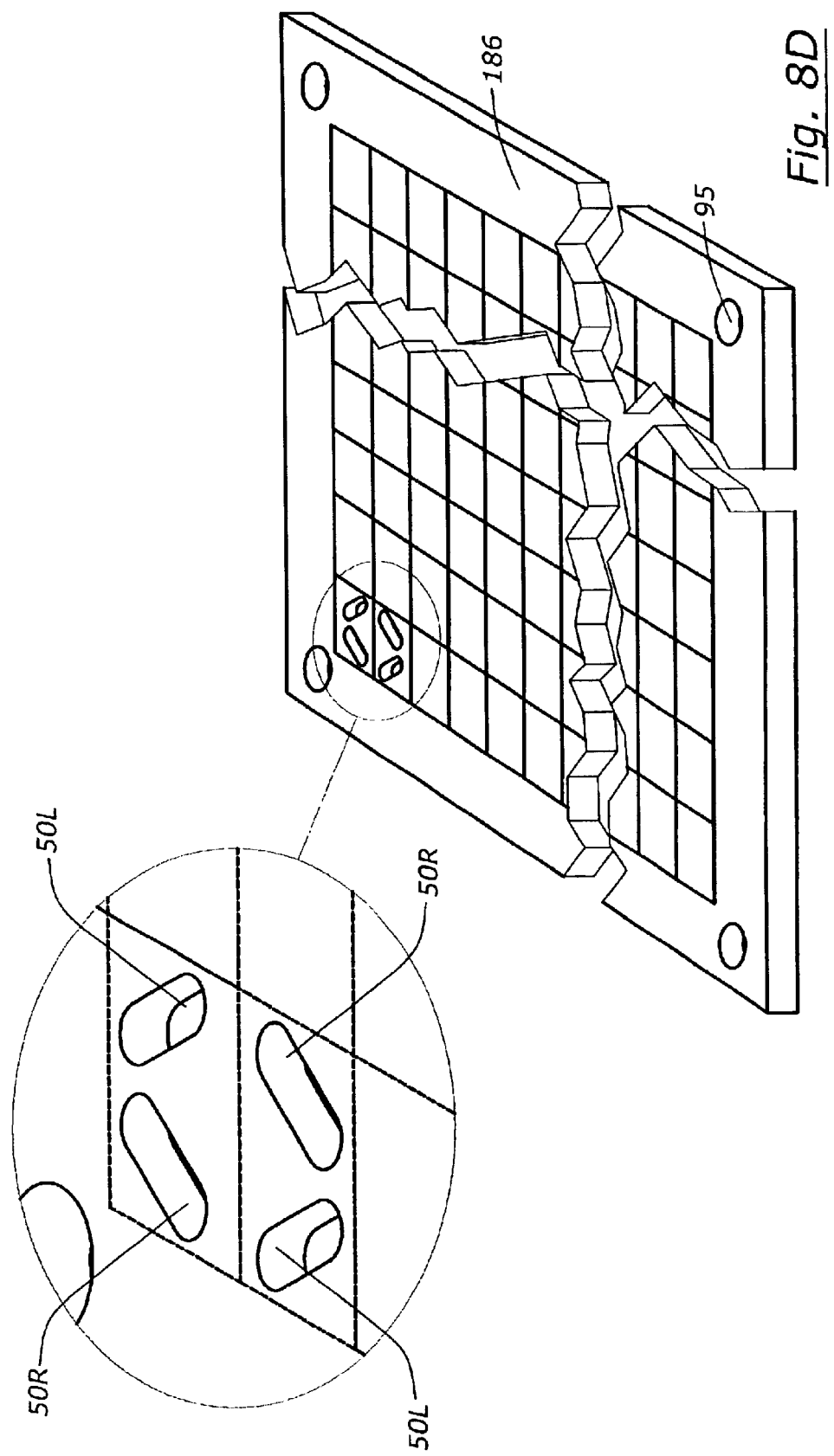

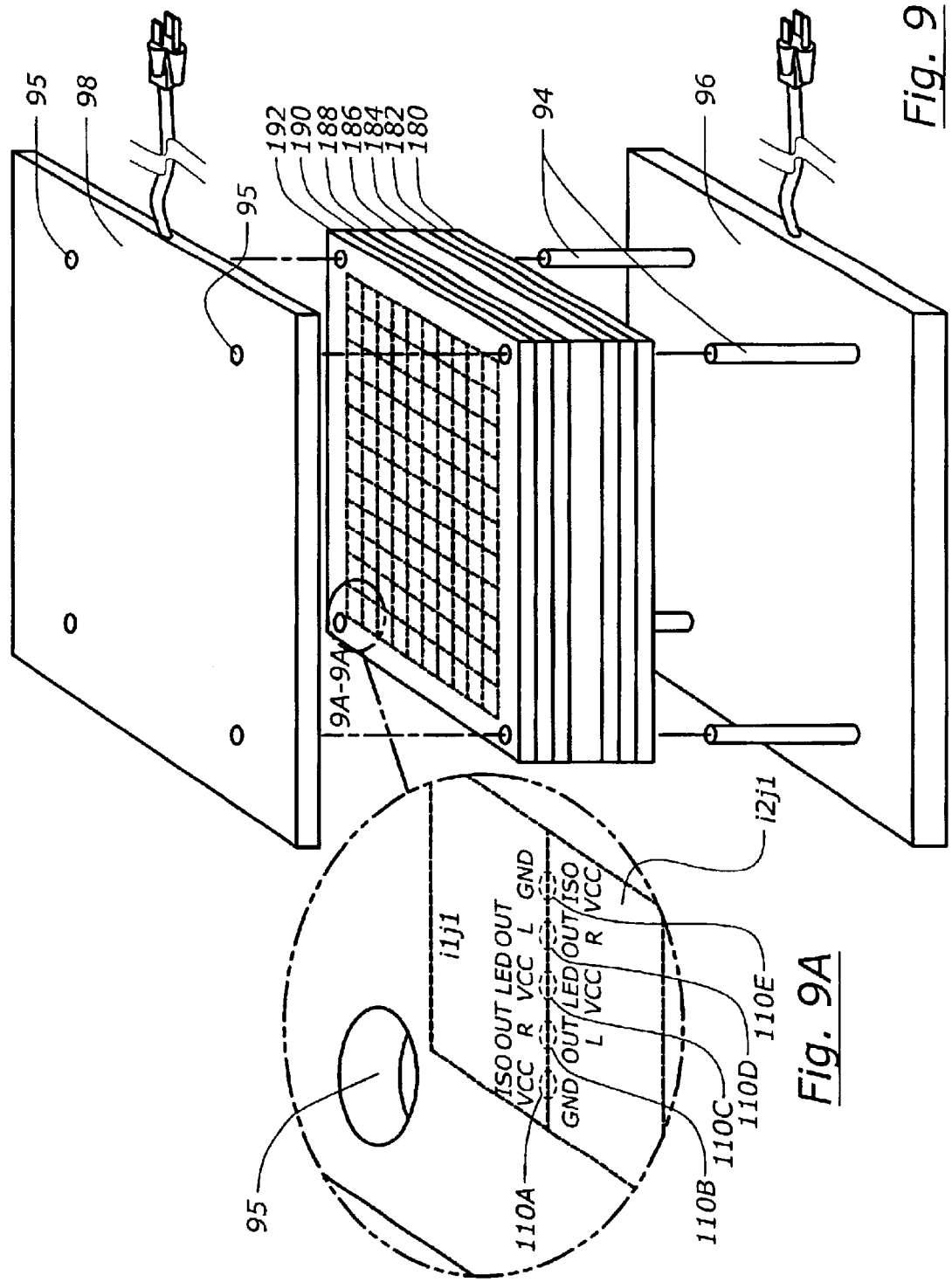

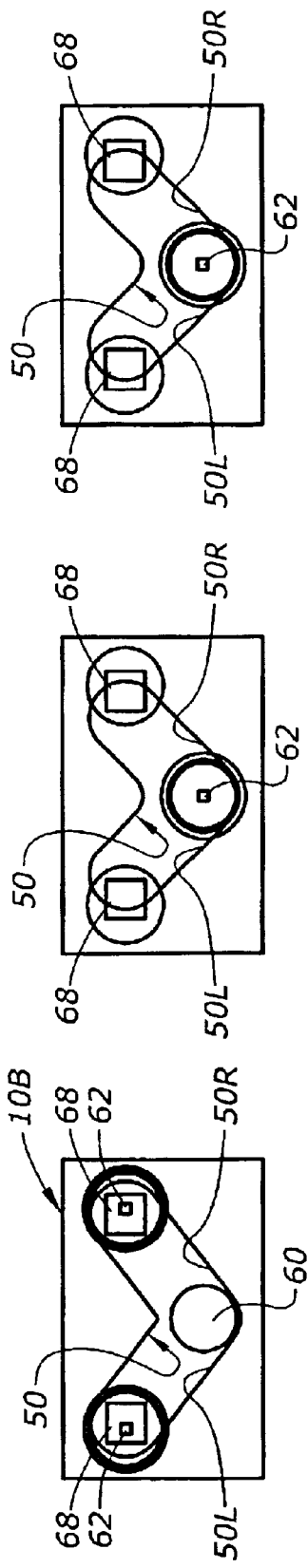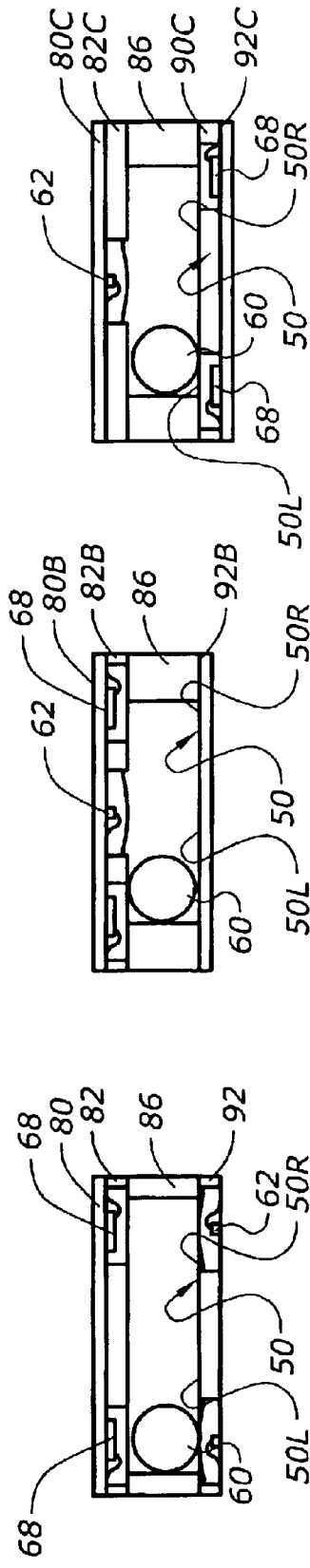

TILT SENSOR AND METHOD OF MAKING SAME

BACKGROUND OF THE INVENTION

In many instances it would advantageous or desirable to know the orientation of an object relative to a fixed parameter, e.g. earth's horizon. Still further, automatic or autonomous sensing of orientation many times be can beneficial.

For example, it has been found desirable to sense whether a digital camera is tilted left or right relative to the horizon. A warning can be given to the user (e.g. in case such orientation is inadvertent), or the logic of the camera can otherwise utilize this information.

A variety of tilt sensors (sometimes called inclinometers) exist. Many provide automatic information about angle of an object with respect to gravity. Many are configured to report exact angle relative to horizon. There are instances where such exactness is demanded. However, such configurations tend to be complex and expensive, and can be relatively large in size. They also tend to be more susceptible to error or damage because of sensitivity of components.

There is a need for robust, economical automatic sensors of at least general positional orientation. There is also a need for relatively small sensor size.

In the example of digital cameras, attempts have been made to install tilt sensors inside the camera. One example uses a component that works adequately to automatically indicate substantial tilt relative to one axis. However, it lacks robustness, particularly in the sense that once installed in the camera and integrated with the digital camera circuitry, it may not pass or survive manufacturing or assembly steps (e.g. soldering—it may not pass or function correctly after solder cleaning tests). Its accuracy or functioning may be affected, and therefore, a potential deficiency exists with this type of tilt sensor.

A need has therefore been identified in the art. It is therefore a principal object, feature, and advantage of the present invention to provide a tilt sensor and method of making the same which solves the problems and deficiencies in the art, and/or improves over the state of the art.

Other general objects, features, and/or advantages of the invention can include:
a. relatively non-complex structure.
b. robustness and durability.
c. economy, both as a discrete tilt sensor, as well as in a method of manufacturing a plurality of tilt sensors.
d. efficiency, including size, number of moving parts, power consumption, and operability.
e. ability to produce a digital feedback.

These and other objects, features, and advantages of the present invention will become more apparent with reference to the accompanying specification and claims.

BRIEF SUMMARY OF THE INVENTION

The invention includes a tilt sensor having a body, a space in the body, and a member positionable in the space, the member moveable between at least two positions within the space under the influence of gravity when the body is rotated about an axis, and a detector in the body to detect when the member is in one of the two positions. A method of manufacturing tilt sensors comprises forming the body out of a lamination, one lamination layer defining an interior open space for the member to move between the at least two positions, and additional lamination layers that are positioned on opposite sides of the lamination layer with the member positioned in the space, to contain the member. Additional lamination layers can be utilized. On at least one of the lamination layers, a detector can be positioned and, if electrical or electronic, electrical connections can be integrated, created or mounted onto the lamination layers.

BRIEF DESCRIPTION OF THE DRAWINGS

FIGS. 8A–G are diagrammatical perspective illustrations of pre-fabricated panels in preparation for manufacturing a plurality of sensors by assembling the panels into a lamination.

FIG. 9 is a diagrammatic perspective illustration of a method for creating a lamination of the panels of FIGS. 8A–G.

FIGS. 10A and B are illustrations of an alternative embodiment according to the present invention.

FIGS. 11A and B are illustrations of another alternative embodiment according to the present invention.

FIGS. 12A and B are illustrations of another alternative embodiment according to the present invention.

DETAILED DESCRIPTION OF THE INVENTION

A. Overview

Figure 1:
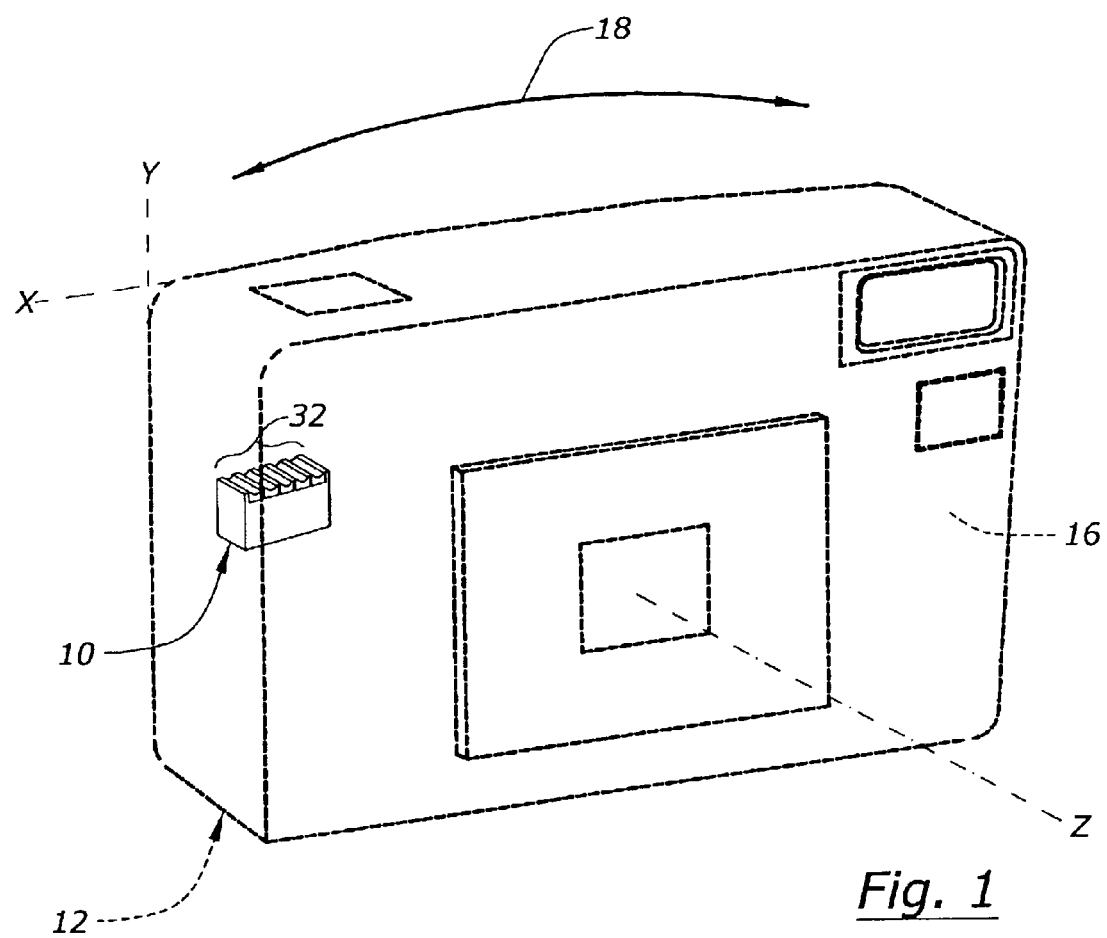
FIG. 1 is a perspective view of a device according to the present invention shown affixed inside and onto the rear wall of a digital camera (shown in broken lines).

To assist in a better understanding of the invention, one specific exemplary embodiment will now be described in detail. Frequent reference will be taken to the appended drawings. Reference numerals and letters will be used to indicate certain parts and locations in the drawings. The same reference numerals or letters will be used to indicate the same parts or locations throughout the drawings unless otherwise indicated.

B. General Environment of Exemplary Embodiment

The present invention relates to a tilt sensor. In this exemplary embodiment, it will be discussed in conjunction with a digital camera, serving the function to produce and report automatically if the digital camera is tilted to the left or to the right greater than a certain rotational angle. As can be appreciated, this autonomous automatic reporting can be beneficial and useful. It is to be understood, however, that this is but one example of application of the tilt sensor according to the invention and does not limit its application to this environment.

C. Basic Structure and Operation

FIG. 1 illustrates a tilt sensor 10 according to the present invention attached (by adhesives or other methods) to the inside back wall of digital camera 12. For purposes of discussion, the back wall of camera 12 will be considered generally planar, and defined by the axes X and Y in FIG. 1.

The front wall of the camera will be designated by reference numeral 16. The axis Z, orthogonal to the X-Y plane, is also shown in FIG. 1. The X-Y plane therefore generally depicts a vertical plane of the camera. The Z-axis is generally aligned with the aiming axis of the lens of camera 12.

Figure 6:
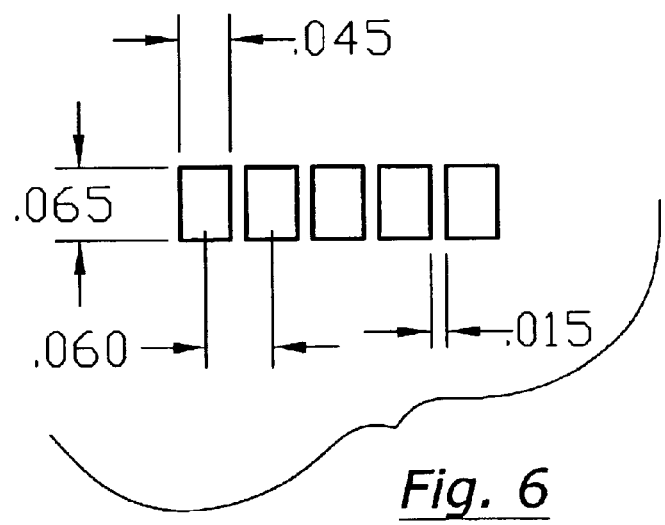
FIG. 6 is a schematic diagram of a recommended PCB solder pad footprint for electrical connection of the exemplary embodiment of the invention to another device.

Sensor 10 has a body that includes an external set of electrical contacts 32. As can be appreciated, and as is well-known in the art, these electrical contacts can be configured to be connectable to electrical conductors in digital camera 12 that can communicate electrical power to tilt sensor 10 and communicate output from tilt sensor 10 to camera 12. The solder pad footprint configuration of FIG. 6 illustrates a connection interface to the digital camera.

Sensor 10 is configured so that it will generate an output signal from which can be derived whether camera 12 is rotated around axis Z in either the left or right direction (see arrow 18 in FIG. 1) on the order of 90 degrees or more in either direction. Camera 12 can utilize this information to alert the operator, store such information with any digital picture data that might be taken when the camera is in that orientation, or for other uses.

Figure 2A:
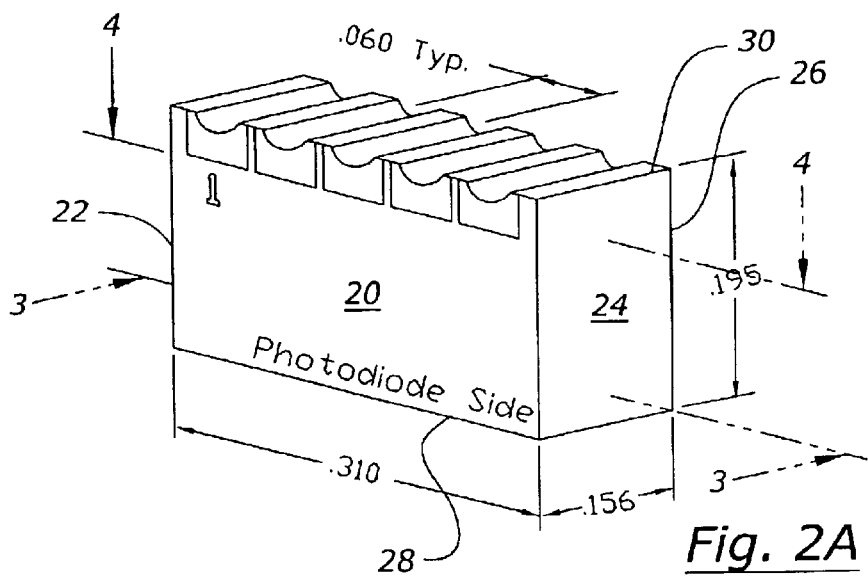
FIG. 2A is an enlarged perspective view of the tilt sensor of FIG. 1 from a slightly different angle and separated from the camera.

FIGS. 2A–C, and FIGS. 3–6, show a specific exemplary embodiment tilt sensor 10 in more detail. As indicated in FIG. 2A, tilt sensor 10 can be on the order of 0.2 inches tall, 0.3 inches long, and 0.15 inches thick. In this relatively small package, contained in substantially sealed fashion, are the inner-workings for the tilt sensor.

The tilt sensor body has a front 20, a left side 22, right side 24, back 26, bottom 28, and top 30. As mentioned, in this embodiment, top 30 includes a plurality of electrical contacts 32 of electrically conducting material, namely ground 34, left output 36, LED voltage IN 38, right output 40, and ISO (electrically isolated) voltage IN 42 (e.g. standard DC operating voltage such as 5 VDC or 3.3 VDC) (see FIG. 5). Contacts 34, 36, 38, 40, and 42 are configured such that they are adapted to be easily electrically connected to electrical circuitry of digital camera 12.

Figure 2B:
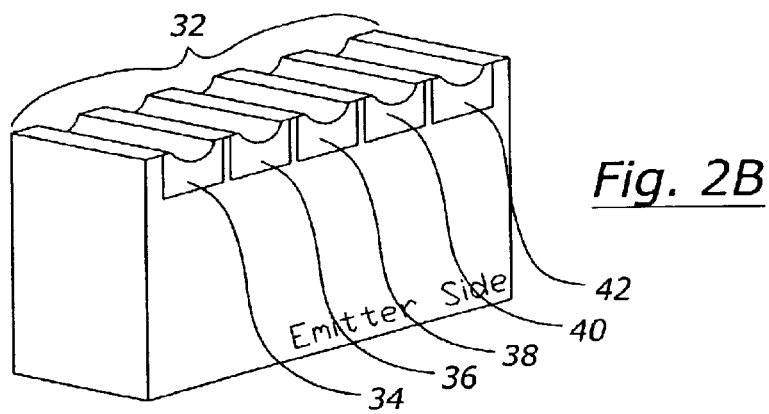
FIG. 2B is a perspective view of the opposite side of the device of FIG. 2A.
Figure 2C:
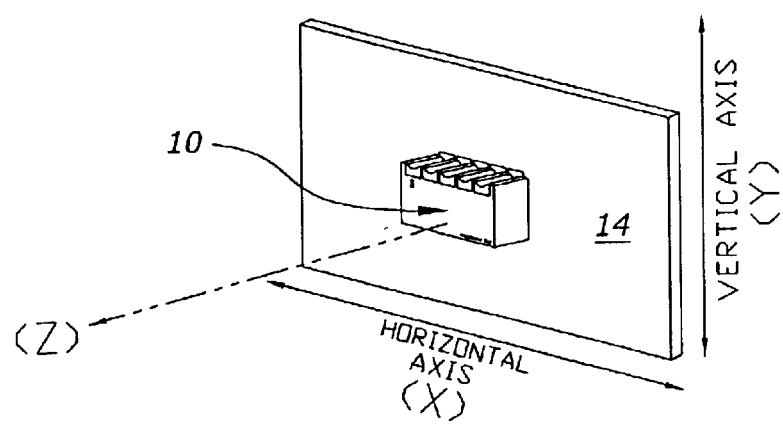
FIG. 2C is a reduced-in-size perspective view similar to FIG. 2A but illustrating the tilt sensor attached to a surface.

FIG. 2C illustrates tilt sensor 10 isolated on a X Y plane (e.g. back wall 14 of digital camera 12). This will be called the general reference position of tilt sensor 10. When sensor 10 is in the reference position, the X-axis and the longitudinal axis of tilt sensor 10 (its longitudinal axis is between left and right sides of sensor 10 and between and parallel to the front and back walls 20 and 26 of tilt sensor 10) is generally parallel to horizontal.

Figure 3:
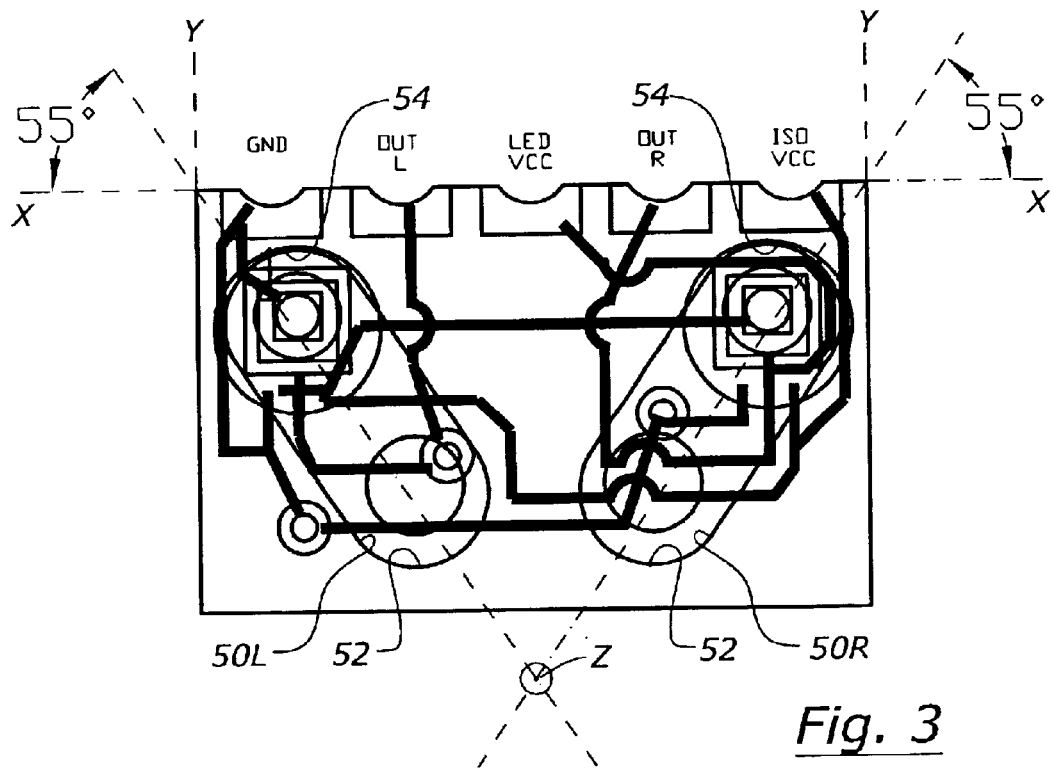
FIG. 3 is a sectional view taken along line 3—3 of FIG. 2A.
Figure 4:
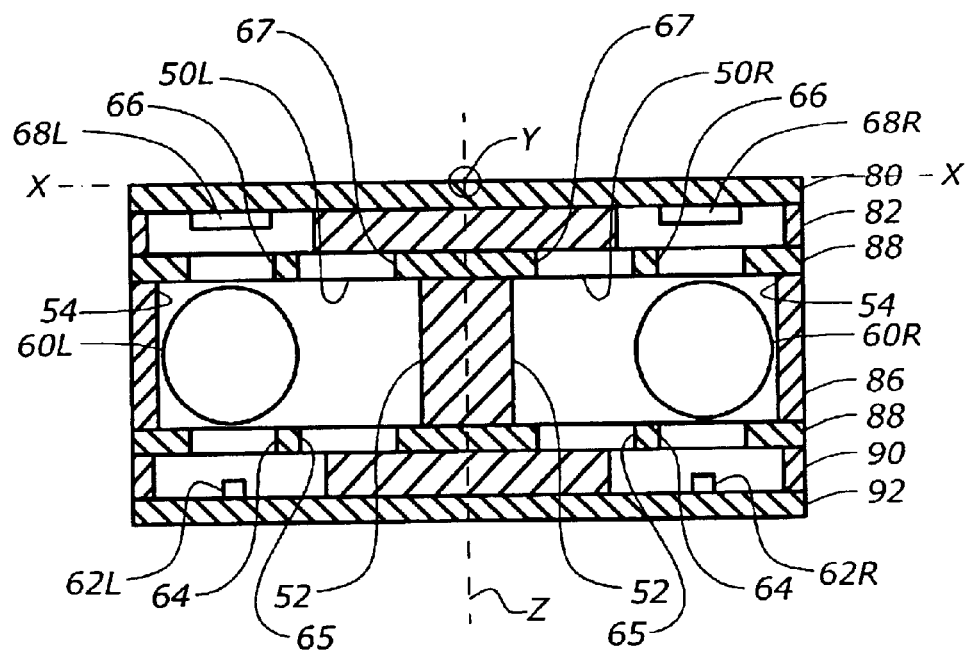
FIG. 4 is a section taken along line 4—4 of FIG. 2A.

Internally, stainless steel balls 60L and 60R are captured in elongated ball tracks or races 50L and 50R respectively (see in particular FIGS. 3 and 4). These tracks or races 50 are configured to be at approximately 55 degrees angles to the X-axis or longitudinal axis of sensor 10, but extend in different directions, as shown in FIG. 3. Each race 50 is sized and configured to allow its ball 60 to freely move (after overcoming the coefficient of friction between ball 60 and the structure defining its race) between a bottom or lower end 52 and upper end 54, but restrain any movement other than along the longitudinal axis of that track 50. In other words, the structure that defines the open area, space, or channel comprising race 50 completely surrounds ball 60 but allows it to roll or slide between opposite ends 52 and 54. Balls 60 are solid stainless or chromed steel (0.062 or $\frac{1}{16}^{th}$ inch diameter). Tracks 50 are approximately $\frac{1}{10}^{th}$ inch long. Race 50 is sized such that ball 60 can not move other than along the longitudinal axis of race 50 (between ends 52 and 54). There can be a small tolerance between the diameter of ball 60 and the diameter of race 50 (e.g. approximately 0.005 to 0.008 inch). If a ball 60 completely overcomes the coefficient of friction of any structure it is in contact with, it can slide—as opposed to roll. In this embodiment, the structure defining race 50 is an epoxy glass material which is quite hard and smooth, and therefore has a relatively low coefficient of friction.

As shown most clearly at FIG. 4, LED emitter 62 and photo detector 68 are placed on opposite lateral sides of upper end 54 of each track 50. Openings 64 and 66, through intermediary structure in sensor 10, provide an unobstructed path between each LED 64 and photo detector 68 set, except if ball 60 intervenes.

As shown in FIG. 2C, with device 10 essentially horizontal (in its reference position), balls 60L and 60R would be forced by gravity to the lower end 52 of their respective ball track 50. Neither ball 60L or 60R would obstruct the path between its respective LED 62 and optical detector 68 pair. Tilt sensor 10 would thus be in what will be called a normal or reference position.

Figure 7:
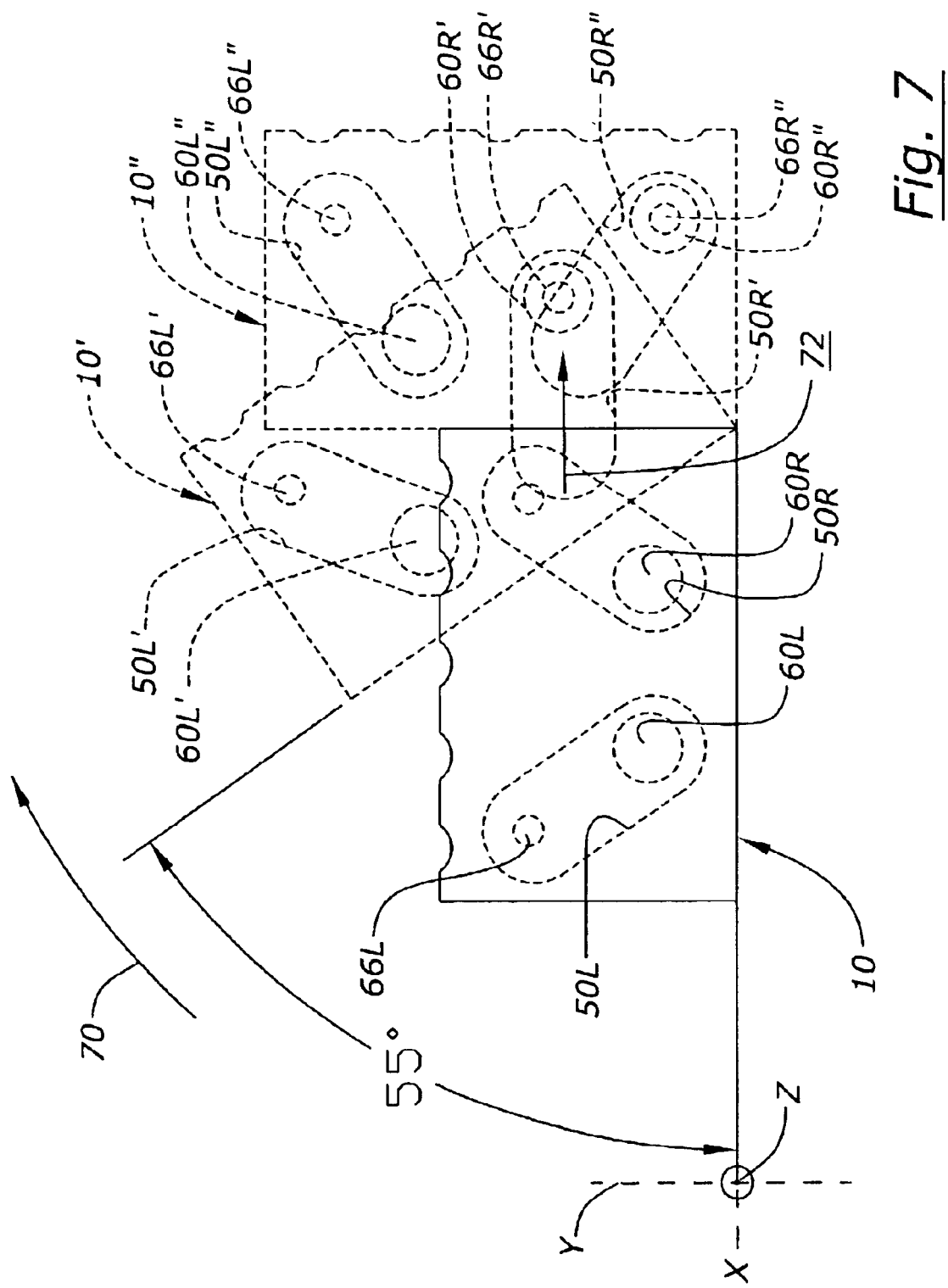
FIG. 7 is an enlarged sectional view similar to FIG. 3 diagrammatically illustrating the tilt sensing function of the exemplary embodiment.

By referring to FIG. 7, the way in which tilt sensor 10 can report tilted position is diagrammatically illustrated. In FIG. 7, a single tilt sensor is illustrated in three positions. A first position (indicated by reference number 10) shows tilt sensor 10 in the reference or normal position, with its longitudinal axis essentially parallel to horizontal. Balls 60L and 60R are (by gravity) in the bottom of their respective ball tracks 50L and 50R, and photo optical detectors 68L and 68R are unobstructed.

Balls 60L and 60R will, by gravity, remain towards the lower part of ball tracks 50L and 50R, until one of the tracks 50L or 50R approaches and then passes horizontal, such that its upper end 54 is below a horizontal plane through its lower end 52. This occurs when sensor 10 is tilted or rotated generally in the direction of arrow 70 in FIG. 7 over 55 degrees relative its Z axis (which would extend orthogonally out of the page of FIG. 7). At that point (see depiction of sensor at reference numeral 10' in FIG. 7), where device 10 is tilted enough to the right, just ball 60R' will begin rolling or sliding by gravity towards the upper end of ball track 50R' (assuming ball 60R overcomes the coefficient of friction or is forced by gravity to roll) (see arrow 72 in FIG. 7). On the other hand, even though sensor 10 is tilted, ball 60L' will remain in the bottom of its ball track 50L'. Rotation well past 55 degrees (closer to 90 degrees) (see depiction of sensor at reference numeral 10" in FIG. 7) will cause ball 60R" to roll or slide all the way to end 54 of ball track 50R", which will block opening 66R" and thus block the corresponding photo optical detector 68 R". In this manner, tilt sensor 10 will interrupt the beam of infrared (IR) light energy from LED 64R, which will be detected by photo detector 68R, thus providing automatic indication that can be output from device 10 indicating that tilt sensor 10 has been rotated around the Z axis approximately or towards 90 degrees. This signal can be utilized by digital camera 12 as previously explained.

Thus, sensor 10 can give feedback about rotation or roll left or right of camera 12 around the Z axis. This assumes that camera 12 is not substantially pitched fore or aft (i.e.

rotated about the X axis). Yaw (rotation around the Y axis) is generally irrelevant.

Note that even in an approximate 90 degree rotational position (reference numeral 10" in FIG. 7), ball 60L does not move from its lower position in its ball track 50L. But, as can be appreciated, rotation of tilt sensor 10 in the opposite direction around the Z axis past 55 degrees would cause ball 60L to roll or slide to the opposite end of its ball track 50L and block photo optical detector 68L, whereas ball 60 would not block photo optical detector 68R, allowing tilt sensor 10 to produce an output signal indicating a rotation or tilt in that opposite (in this example the left) direction of on the order of 90 degrees.

In this embodiment, LED's 62 are infrared (IR) LEDs (e.g. model # T 9511 VA available from Vishay Infrared Components, Santa Clara, Calif.—e.g. 800 NM IR LED having physical size that can surface mount within the space indicated in FIG. 4). Photo optical detectors 68 are photo sensitive IC's with Schmitt triggers (e.g. model # T 2271 PIC from Vishay Infrared Components—e.g. physical size to fit within the space indicated in FIG. 4 and triggering off of the wavelength of radiation emitted by LED 62). Device 10 can be considered a two channel interruptive tilt sensor or inclinometer which can provide digital feedback to a digital camera of its general orientation relative to the natural horizon of earth. Feedback is provided through the use of the steel balls 60 that self-position themselves relative to gravity and interrupt the light that couples the two optical components 62 and 68 in any one channel. Depending on the orientation of the device 10 (and thus the object to which it is attached), the balls 60 either allow light from the IR LED 62 to couple with its respective photo sensitive IC 68 or block the light to decouple the two active components within the channel related to the side of inclination. Of course, detector 68 would have a trigger threshold which is a function of amount of light that is gathered by it.

LED's 62 and photo detectors 68 are aligned across from each other so that when the LED 62 is on, light travels through device 10 through the two apertures 64 and 66. Being a normally high device, when light falls incident on the photo sensitive area of photo detector 68, the Schmitt Trigger changes state and the signal is switched to low. As the device 10 is rotated, a steel ball 60 is forced (via gravity) to the end of its channel or track 50, covering the respective apertures or holes 64 and 66, and blocking the light from its corresponding LED 62. The Schmitt Trigger changes state to high. In this manner, device 10 can detect an approximate 90 degree rotation in either the left or the right direction. It is therefore a single axis tilt sensor. It can provide a digital representation of tilt in opposite directions relative an axis.

Figure 5:
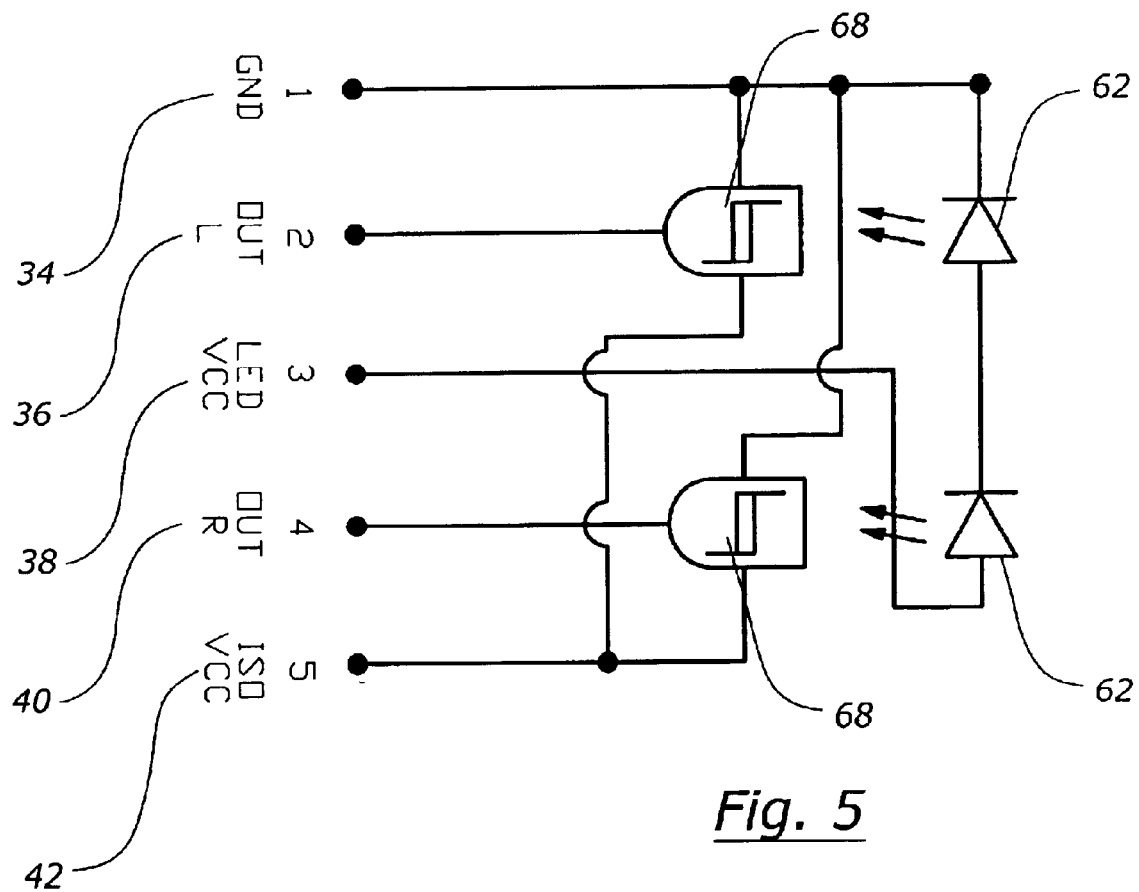
FIG. 5 is an electrical schematic of the electrical circuitry for an exemplary embodiment of the invention.

FIG. 5 diagrams the basic electrical circuitry of device 10. Of course, other ways are possible. Electrical power (+2.5 to 5.5 VDC) for LED's 62 and detectors 68 (LED VCC and ISO VCC—filtered to provide a clean incoming line, e.g. high or low band pass filtered to eliminate ripple) would be provided from the battery source of camera 12. The state of detectors 68 can be discerned at OUT L and OUT R.

Method of Construction

The exemplary embodiment of device 10 is a printed circuit board (PCB) laminated structure consisting of seven layers of black (opaque) FR4 epoxy glass PCB material having a Tg of approximately 150 degrees Celsius. This is indicated most clearly at FIG. 4.

A first layer will be called race PCB 86, and comprises a relatively thick layer of PCB (slightly bigger than the diameter of ball 60) of the general perimeter dimensions of device 10 and in which are pre-formed ball tracks 50L and 50R. On either side of race PCB 86 is what will be called aperture PCBs 84 and 88 of like perimeter dimensions to layer 86 but, here, of smaller thickness. Aperture PCB 84 contains openings 66 (smaller than ball 60) pre-formed and positioned to correspond with the placement of photo detectors 68. Aperture PCB 88 includes pre-formed openings 64 (smaller than ball 60) positioned to correspond with LEDs 62. Aperture PCBs 84 and 88 also serve to contain balls 60L and 60R in their respective tracks or races 50 once layers 84, 86 and 88 are assembled.

Spacer PCBs 82 and 90 are positioned on the exterior sides of aperture PCBs 84 and 88 respectfully and have pre-formed openings which correspond to and provide space for photo detectors 68 and LEDs 62, which extend inwardly from the outer detector PCB 80 and LED PCB 92 respectively, which complete the seven layer lamination make-up the body of device 10. Thus, the only moving parts are balls 60L and 60R. The materials making up the body are relatively economical (PCB). The optical components are secured by methods known in the art and are non-moving. The laminated structure basically encapsulates the working components and the moving components. Once constructed, the body is not necessarily completely or hermetically sealed, but it is adequately enclosed and encapsulated at least for, e.g., use inside a digital camera.

But further, this laminated structure can be efficiently and economically implemented in a manufacturing process that can concurrently fabricate a plurality of devices 10, as described below. As is diagrammatically illustrated at FIG. 8, the features of each layer 80, 82, 84, 86, 88, 90, 92 of a single sensor 10 can be replicated a plurality of times in large layers or panels 180, 182, 184, 186, 188, 190, 192, of the same material and thickness as layers 80, 82, 84, 86, 88, 90, 92.

Figure 8A:
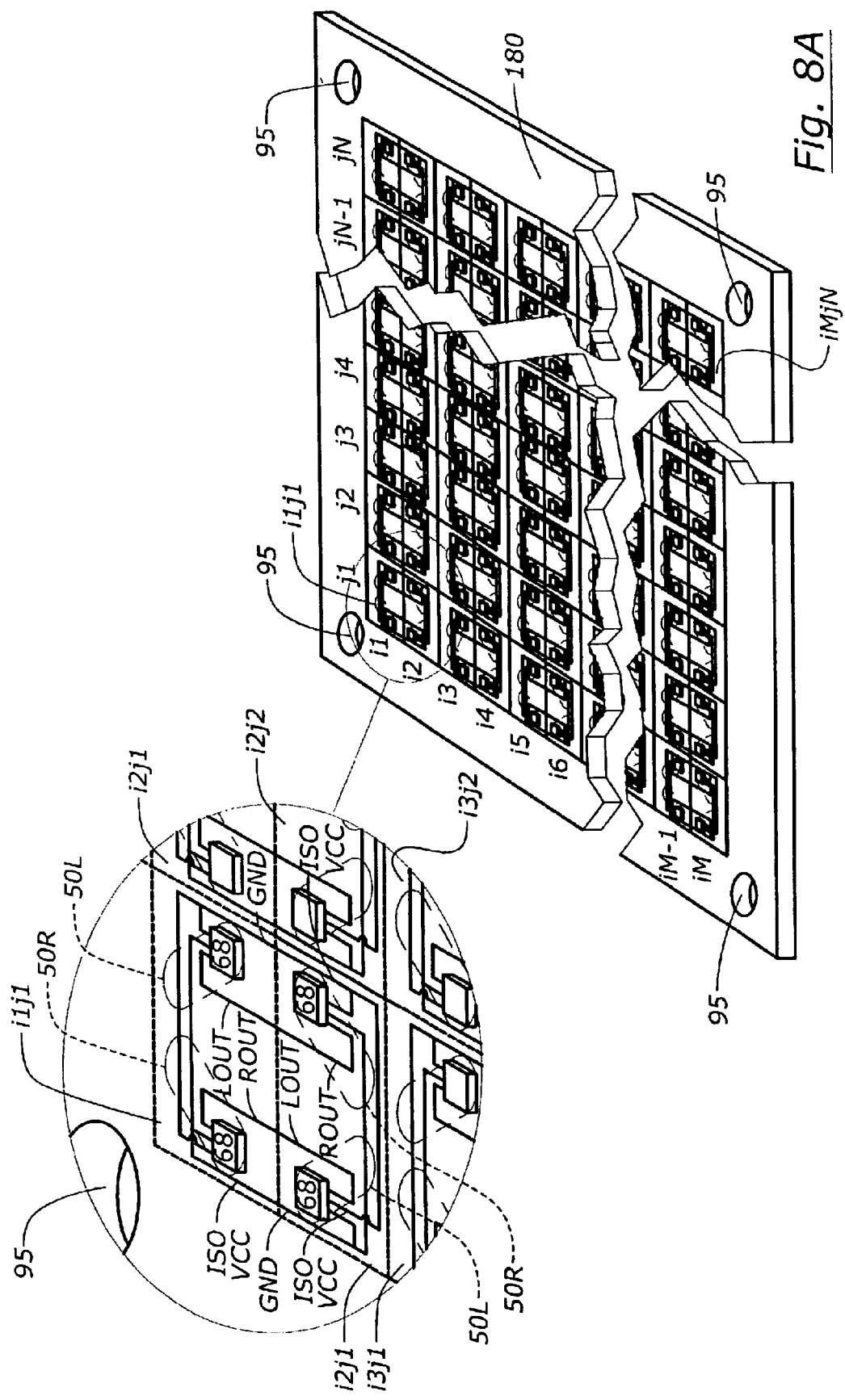

As indicated in FIG. 8A, for example, each of the seven large panels 180, 182, 184, 186, 188, 190, 192 could be partitioned or divided into sections each having the perimeter dimensions of approximately one device 10. Here, starting in the upper left-hand corner of the diagram of FIG. 8, a first section of each large panel can be indicated as portion i1 j1. A second section in the first row is indicated as i1 j2. The last equivalent section in the first row is i1 jN.

The plurality of columns can be repeated from i1 to iM. By methods well-known in the art, each of the seven layers can be pre-fabricated to contain either the electrical or photo electrical components and associated printed circuits to operate the same, and/or pre-cut openings or other contour.

For example, the two photo diodes 68 needed for a single tilt sensor 60 can be pre-installed on each portion i1j1 to iMjN of large panel 180 (see FIG. 8A). Printed circuits needed to supply electrical communication from these two photo detectors 68 to outputs 36 and 40 can be pre-printed on that layer 80. Conventional surface mount (SMT) techniques can be used for mounting the optical components to their substrates or panels. In this example, LEDs 62 and detectors 68 are die attached and wired bonded to their respective panels 180 and 192. As can be appreciated, a pair of detectors 68 can, by automation, be installed at the appropriate location on each section iX jY of large panel 180 and the appropriate printed circuit, by automation, also installed according to standard PCB and SMT fabrication techniques.

Still further, the architecture of the electrical components and circuitry fabricated onto panel 180 can be as shown in FIG. 8A; a pair of photodetectors 68 and associated printed circuit on each section i1j1 to i1jN (the first row i1 of panel 180) with the electrical lines all terminating at the junction with its adjacent section in row i2. The relative position of elongated ball tracks 50L and R are shown in ghost lines in FIG. 8A to indicate how the position of detectors 68 would align therewith.

Then, each section i2j1 to i2jN is basically a mirror-image of its corresponding adjacent section in row i1, with electrical lines also terminating at the junction between sections. That combination of diodes and printed circuits can then be repeated and replicated on succeeding adjacent pairs of rows for the entire large panel 180, to fill up panel 180 as shown in FIG. 8A. This can be advantageously used to simplify the formation of final electrical connections 34, 36, 38, 40, and 42 for each sensor 10, as will be explained later.

Figure 8B:
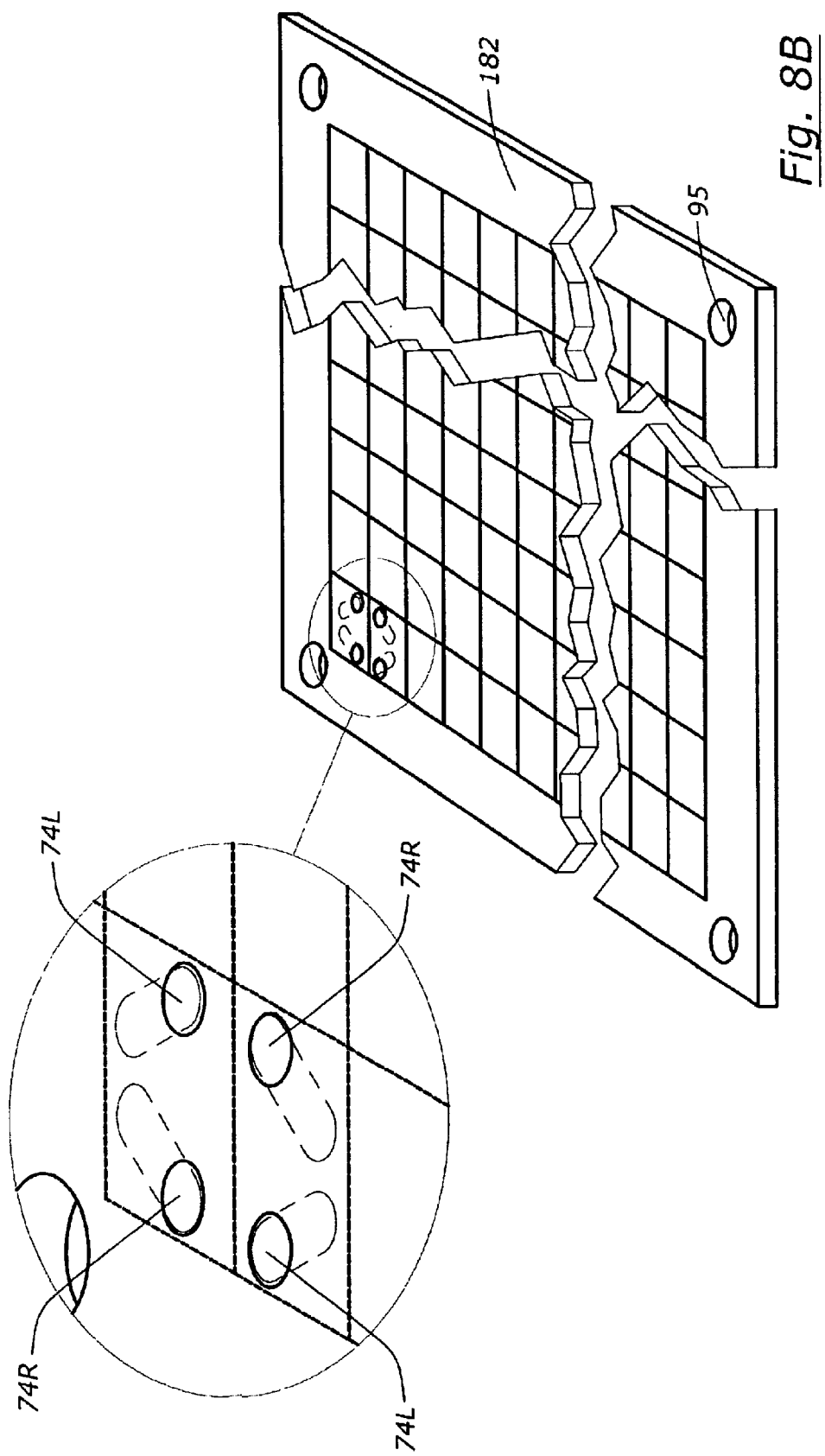

As shown in FIG. 8B, similarly the pair of openings 74L and R and 75 for spacer PCB 82 for a single sensor 10 can be pre-fabricated (cut out) and repeated in each section i1j1 to iMjN of large panel 182. Openings 74 and 75 could be prefabricated by well known automated techniques for cutting shaped openings in wafers or PCBs. FIG. 8B only shows two pairs of openings (in sections i1j1 and i2j1), but openings 74L and R would be plotted and cut out in each section on panel 182 to align with ball tracks 50L and R (see ghost lines of ball tracks 50L and R).

Figure 8C:
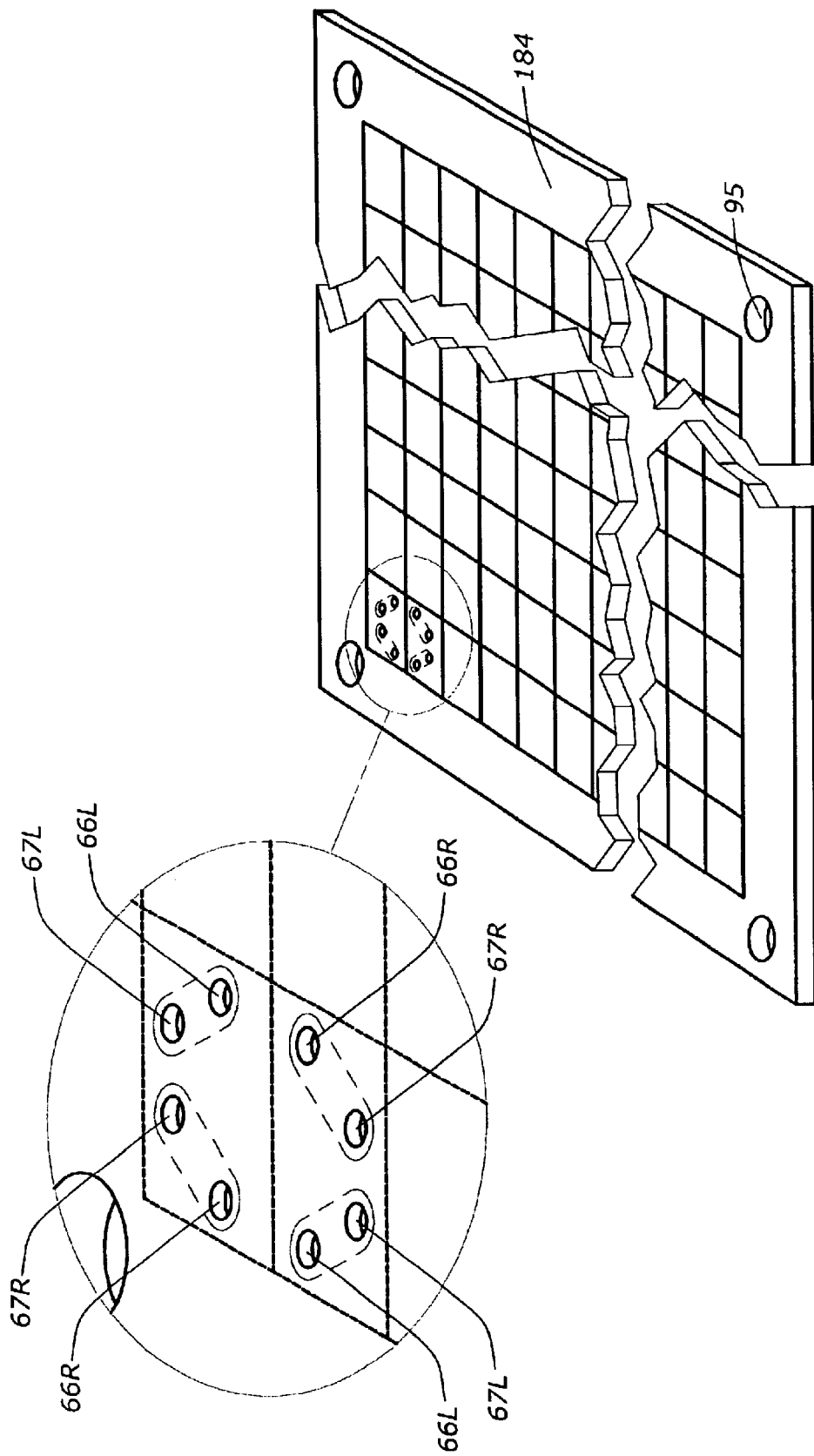
Figure 8E:
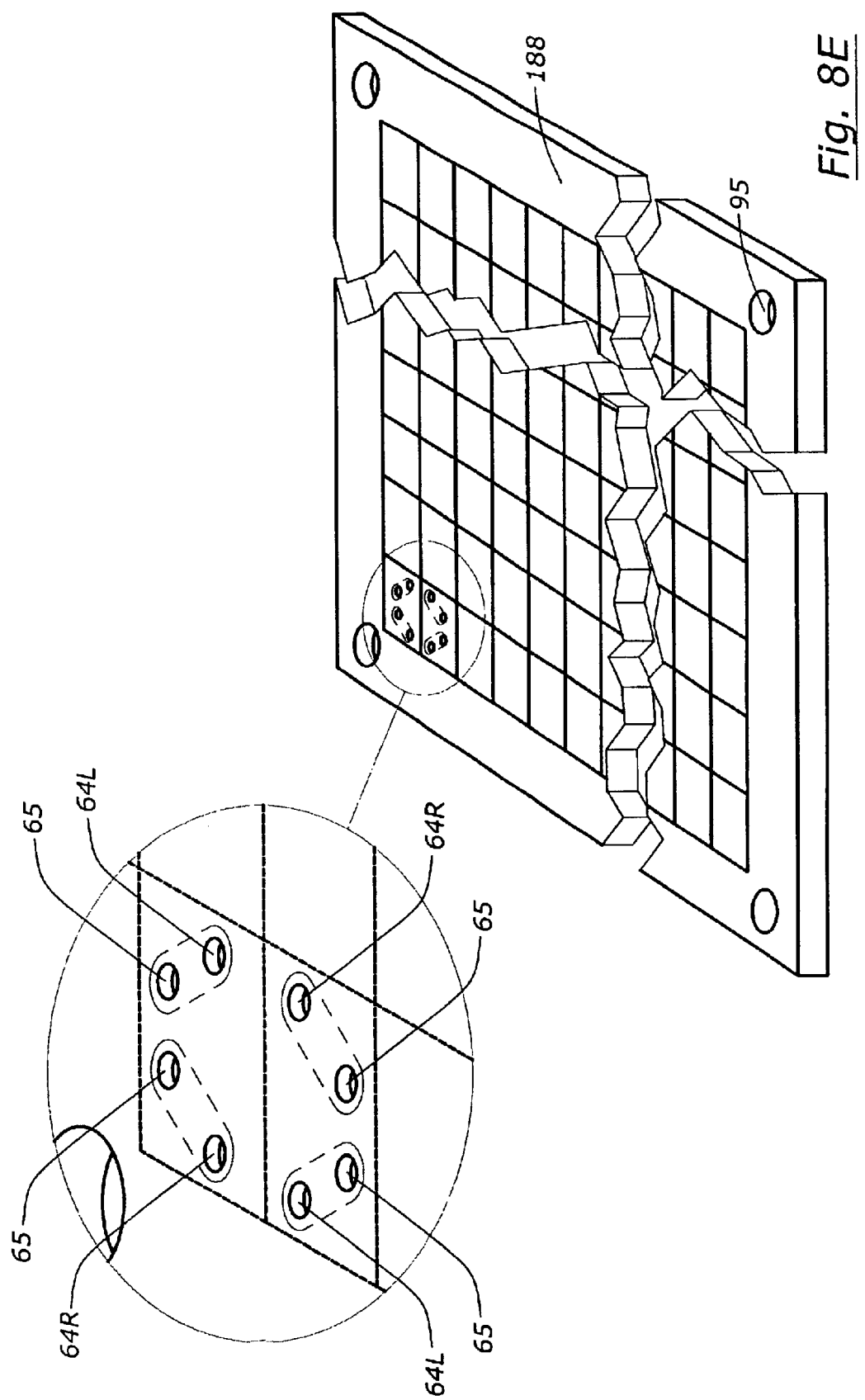
Figure 8F:
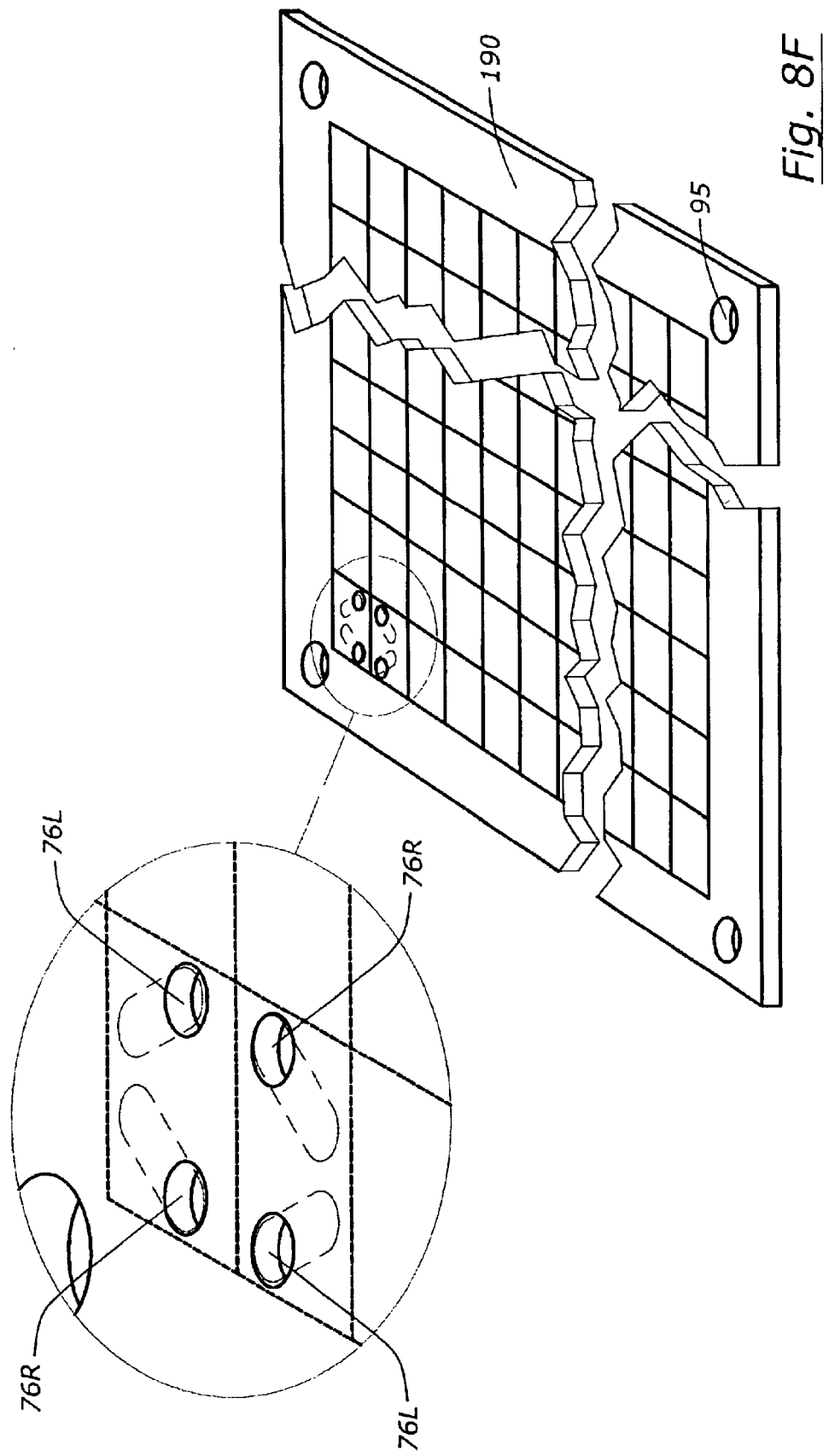
Figure 8G:
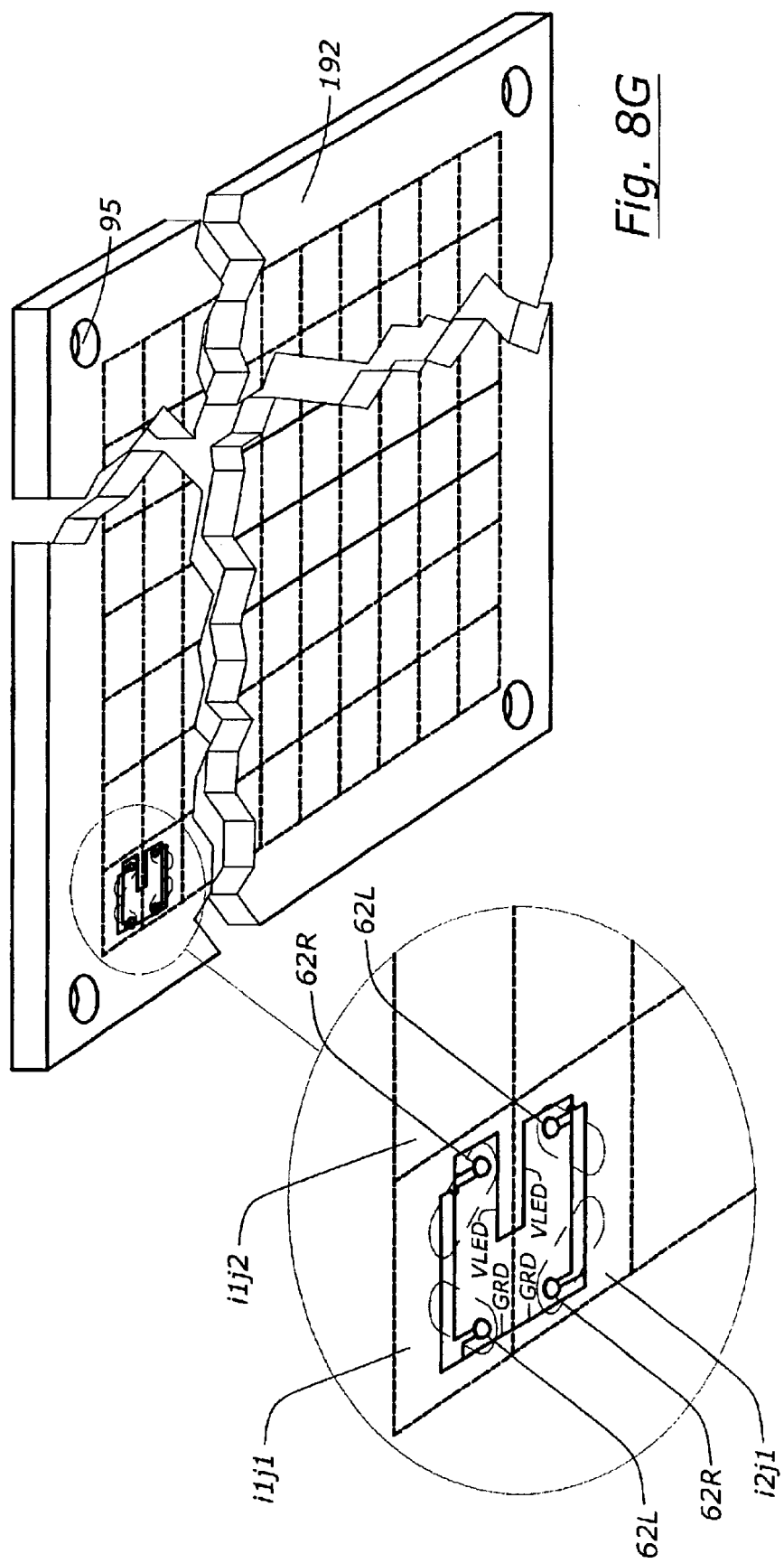

The openings 66 and 67 in aperture PCB 84 can be pre-fabricated and repeated in all positions i1j1 through iM jN for large panel 184 (see FIG. 8C). Again, only two sets of apertures (in sections i1j1 and i2j1). Each section iXjY would have them appropriately positioned and pre-formed.

Races 50R and 50L could be pre-fabricated and repeated for each section i1j1 to iMjN of large panel 186; and so on for large panels 188, 190, and 192 (with LEDs and associated printed circuits surface mounted to panel 192 in a similar manner to the detectors and associated circuits of panel 180). Again for layers 186, 188, 190, and 192, the pre-fabricated openings or surface mounted structure are shown on sections i1j1 and i2j1 only, but would be prefabricated for each section i1j1 to iMjN.

Once all large panels 180, 182, 184, 186, 188, 190, and 192 are substantially pre-fabricated as described above in association with FIGS. 8A–G, they can be assembled into a large seven layer lamination as follows. A jig or fixture (diagrammatically depicted in FIG. 9) using bottom and top heated platens and alignment pins can be used, such as are well known.

Detector panel 180, with surface mounted detectors 68 and printed circuits premounted across panel 180, is placed face-up (through appropriately positioned, pre-fabricated alignment holes 95 in panel 180) onto alignment pins 94 of a lower heated lamination platen 96 (see FIG. 9).

Next, panel 182 is superposed upon panel 180 by placing it on pins 94 so that each of its prefabricated openings 74 and 75 in each of its sections are aligned above corresponding detectors 68 on detector panel 180.

Similarly, prefabricated panel 184, with pre-formed openings 66 and 67 repeated at each section, is next placed on pins 94 over panel 182. In turn panel 186 is placed over panel 184.

At this point, pairs of steel balls 60L and 60R are placed in corresponding ball tracks 50L and 50R in each of the sections i1 j1 through iM jN. This is possible because one side of ball tracks 50L and 50R are exposed at this point in the assembly process. Once all sets of balls 60L and 60R are in place, panel 188 is placed in aligned position on alignment pins 94 over panel 186.

Stacking of the seven panels on pins 94 is then completed by placing panel 190 (with prefabricated openings 76L and 76R) and then panel 192 (with pre-installed printed circuitry and with surface mounted LEDs 62 facing down) on pins 94 in sequence.

An upper heated platen 98 is then operatively positioned onto the stack of panels on pins 94 and, by techniques well known, platens 96 and 98 are moved towards each other to apply pressure to the stack. The temperature of both platens 96 and 98 is increased to around 175 degrees Celsius and pressure is increased to press the panels tightly together. This assembly will then remain under pressure for about an hour, allowing the heat to melt the B stage epoxy used between panel layers to bond the seven aligned panels together into a large lamination. Once the bonding process is completed, the panel assembly is allowed to appropriately cool.

After the seven-layer lamination is completed and cooled, electrical contacts 34, 36, 38, 40, and 42, on top side 30 of each device 10 (as shown in FIG. 2), can be formed by drilling five holes along the junction line between adjacent mirror-image sections (e.g. i1j1 and i2j1, or i3j7 and i4j7) (i.e. at each junction between sections with the SMT devices, printed circuits, and pre-formed opening mirror images to each other), which would expose the printed circuit lines at those points. Plating could then be added through each of the holes, which may also extend outside the holes (see FIGS. 2A–C), using standard photo resist metalization techniques, to form electrical connections needed. At this point, it may be possible to test operability of each discrete device 10 by indexing through each portion i1j1 to iMjN.

A sawing process (e.g. standard wafer sawing method) is utilized to saw the individual laminated portions i1 j1 to iM jN from the larger laminated panel combination illustrated in FIG. 9. When cutting through the drilled holes, the concave and plated portions for electrical connects 32 would be formed for two devices 10.

In one embodiment, such a laminated panel design is used to create 112 individual devices 10, i.e. cut-out 112 separate sections i1j1 to iMjN, where, e.g., M=8; N=14).

Options and Alternatives

The above-described exemplary embodiment is set forth for example only and not by way of limitation. Variations obvious to those skilled in the art will be included within scope of the invention, which is described solely by its claims.

For example, other types of detectors can be utilized to indicate position of balls 60.

It is not necessarily required that balls be utilized.

The angle of races 50 could be changed.

It may be possible to reduce the number of layers, for example, by combining the functions of certain of the layers.

Furthermore, device 10 could have one ball 60 and one linear track 50, to indicate one direction of tilt. On the other hand, additional balls and tracks could be utilized in one device 10, or multiple devices 10 could be used for single camera or other object, for sensing different amounts of tilt, or even expanding to different axes of tilt.

By still further example, reference is taken to FIGS. 10–15. In FIGS. 10A and B, a single ball 60 is utilized in a single V-shaped ball track 50. Ball track 50 has left and right branches 50L and 50R. At the upper ends of each branch 50L and 50R can be detectors, here shown similar to detectors 68 of the embodiment of FIGS. 1–9. The device of FIGS. 10A and B could similarly detect tilts around 90 degrees either to the left or right but using a single ball 60. Also, this device could be made by the manufacturing process described previously so that a plurality of devices could be fabricated concurrently.

FIGS. 11A and B show an embodiment utilizing the V-shaped track and single ball of FIGS. 10A and B, but utilizing one LED 62 positioned at the base of the V (adjacent to where ball 60 would be in a normal position when device 10 is in a reference position). Photo detectors 68 are positioned at the upper ends of the branches 50L and 50R. Additionally, all electrical components 62 and 68 are positioned on the same layer, thereby reducing the number of layers upon which a printed circuit is needed for the device. In this embodiment, when single ball 60 is in its normal lower position, LED 62 would be blocked and neither detector 68 would receive any radiation (or enough to trigger). This would be the normal non-tilted state of detector 10. When the body is tilted in either direction past the amount needed to start moving ball 60 along one branch of ball track 50, at the point ball 60 unblocks LED 62, radiation from LED 62 would be picked up by the detector 68 in the opposite branch. Suitable programming would interpret such an output to indicate tilt of the device in the opposite direction from the detector 68, which senses radiation from LED 62. As can be appreciated, by appropriate structure and thresholding, reflective principles could be used to trigger detector 68 L or R depending on which way LED light bounces off of a single ball 60.

FIGS. 12A and B also show a single ball 60, V-shaped ball track 50 arrangement but with LED 62 on a layer opposite detectors 68. Functioning should be similar to that described for the embodiment of FIGS. 10A and B and 11A and B but would require printed circuits on two layers.

The embodiments of FIGS. 11A and B and 12A and B could also be made by the manufacturing process described earlier.

Figure 13:
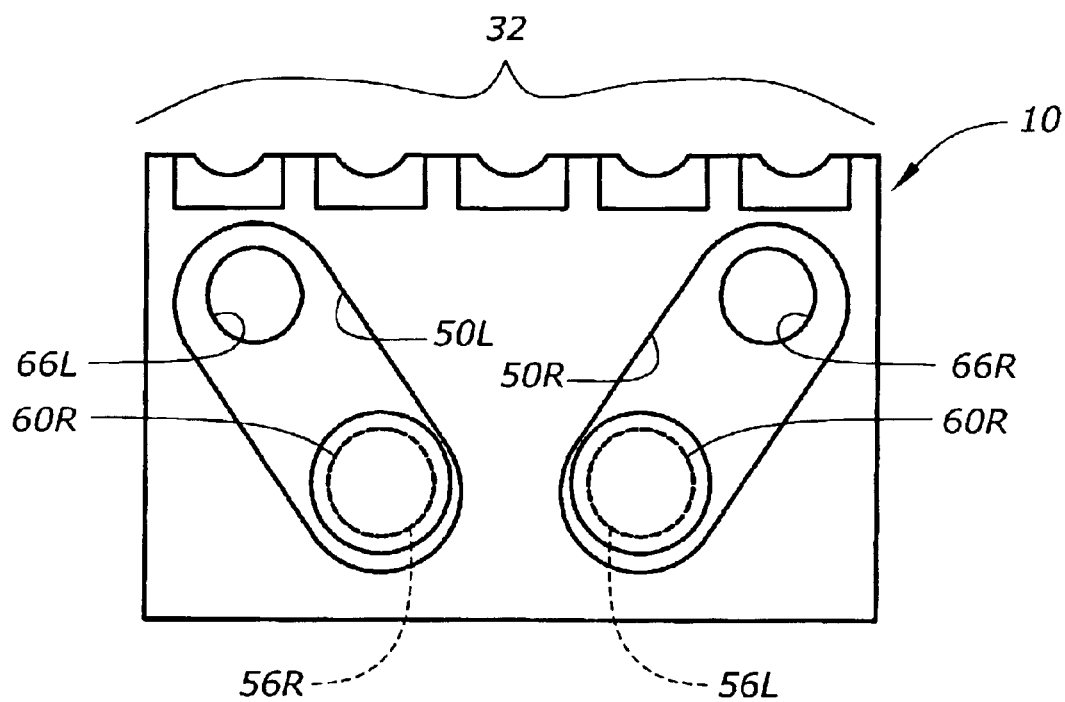
FIGS. 13–15 are illustrations of a still further alternative embodiments according to the present invention.
Figure 14:
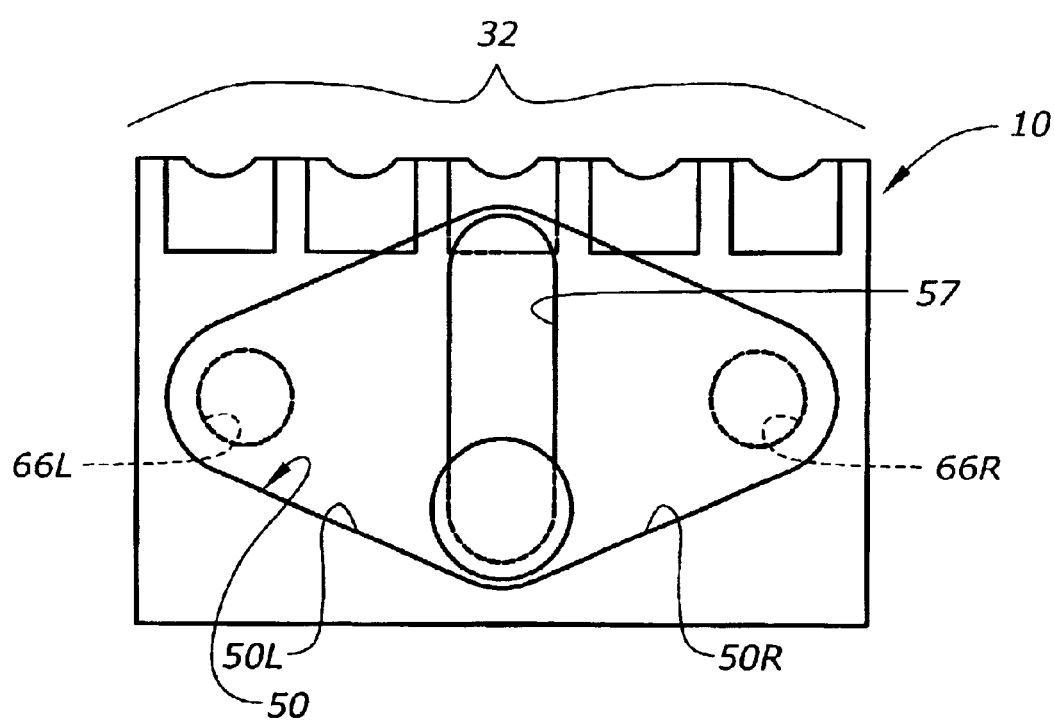
Figure 15:
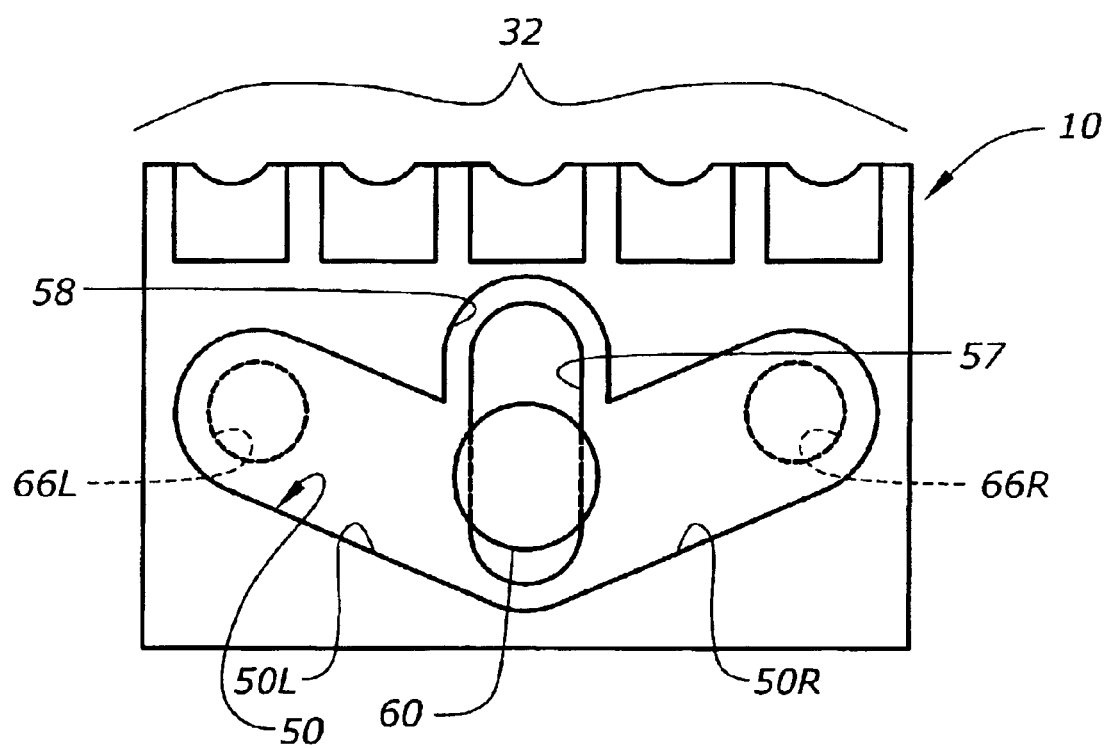

FIGS. 13–15 still further variations. The embodiment of FIG. 13 is very similar to sensor 10 of FIGS. 1–9, but adds the feature of having openings or apertures 56L and R towards the bottom of ball tracks 50L and R. Openings 56L and R are sized to be smaller than the diameter of ball 60, but allow a ball 60 to seat therein if sensor 10 is rotated around its X-axis such that its X-Y plane approaches horizontal (e.g. in the digital camera example, the lens of the camera is turned face down or face up. Balls 60L and R would seat within openings 56L and R and would be deterred from rolling or moving to the opposite ends of ball tracks 50L and R and triggering one or more photodetectors 68L and R, as this could confuse camera 12 or the operator, or would provide information that is not very useful when the camera is in that position.

FIG. 14 illustrates one ball track 50 of diamond shape, with one ball 60. This embodiment works similarly; it can detect a substantial tilt left or right from reference position. It could detect such tilt even if upside down. It also includes a channel or opening 57 that would work like openings 56 of FIG. 13. If sensor 10 is rotated substantially face down or face up (around the X-axis), ball 60 would tend to seat into channel 57 and not roll around ball race 50 and trigger either photodetector.

FIG. 15 is similar to FIG. 14, but instead of a diamond shaped ball race 50, has predominantly a v-shape (similar to FIGS. 10–12). But it does include a central rounded-out extension 58 sized to receive ball 60. Then, if sensor 10 is turned substantially upside down, ball 60 would be forced by gravity into extension or cupped portion 58 and held against movement to trigger either detector 68. It could also include channel 57, like the embodiment of FIG. 14.

Each of the embodiments can be fabricated using the lamination methodology described above.

Other arrangements are, of course, possible. These examples are provided simply to illustrate variations and changes from the embodiment of FIG. 1–9 are included within the scope of the present invention.

What is claimed is:

1. A method of making a plurality of tilt sensors comprising:
    fabricating a layer having a length and width and thickness, and partitioned into a plurality of areas, each area including an opening through the layer;
    placing a moveable member into each opening in said layer;
    positioning additional layers over and under said layer to capture the member yet allow movement of each member between at least two positions in its opening, at least one of said additional layers having integrated thereon at least one of a photo emitter or detector aligned at each opening;
    adhering the layer and additional layers together to form a laminated set of a plurality of tilt sensors;
    cutting out each of the plurality of areas.

2. The method of claim 1 wherein said additional layer comprise a first PCB, a spacer PCB and an aperture PCB.

3. The method of claim 1 wherein the additional layers include openings.

4. The method of claim 1 wherein the member comprises a ball.

5. A method of manufacturing an inclinometer comprising:
    providing a first PCB;
    superposing a second PCB, including an open area, on the first PCB;
    placing a member, moveable within the open area in response to gravity, within the open area;
    superposing a third PCB on the second PCB to capture the member between the first and third PCBs, the member moveable by gravity between positions in the open area;
    the first or third PCB including a pre-installed emitter, the emitter being pre-wired and adapted to emit light into the open area at one of the positions in the open area when combined with the other PCBs;
    the first or third PCB including a pre-installed detector of light from the emitter, the detector being exposed to the open area when combined with the other PCBs; and
    each PCB including adhesive and activating the adhesive when the PCBs are superposed relative to one another to form a lamination of said PCBs.

6. The method of claim 5 wherein each PCB includes a plurality of corresponding open areas, members, emitters and detectors on a plurality of sections of respective PCBs which are positioned to be aligned when the PCBs are superposed.

7. The method of claim 6 further comprising separating the lamination of PCBs by said sections.

8. The method of claim 7 further comprising creating electrical connections for each separated section adapted for electrical communication with another device.

9. The method of claim 5 wherein the lamination encapsulates the member, emitter, and detector.

10. The method of claim 9 wherein the encapsulation seals the member, emitter, and detector.

11. The method of claim 5 further comprising a plurality of open areas on the second PCB.

12. The method of claim 11 wherein the plurality of open areas have longitudinal axes in generally the same plane.

13. The method of claim 11 wherein the plurality of open areas have longitudinal axes in different planes.

14. The method of claim 5 further comprising a seat at one end of the open area which tends to hold the member in the seat until there has been substantial rotation of the lamination around an axes of tilt.

15. The method of claim 11 wherein each detector produces an independent signal.

16. A method of making a plurality of tilt sensors comprising:

fabricating a layer having a length and width and thickness, and partitioned into a plurality of areas, each area including an opening through the layer;

placing a moveable member into each opening in said layer;

positioning additional layers over and under said layer to capture the member yet allow movement of each member between at least two positions in its opening, at least one of said additional layers having integrated thereon at least one of a photo emitter or detector aligned at each opening;

adhering the layer and additional layers together to form a laminated set of a plurality of tilt sensors;

cutting out each of the plurality of areas;

said additional layers comprise a first PCB, a spacer PCB and an aperture PCB.

* * * * *

UNITED STATES PATENT AND TRADEMARK OFFICE
CERTIFICATE OF CORRECTION

PATENT NO. : 6,943,339 B2
DATED : September 13, 2005
INVENTOR(S) : Figueria et al.

It is certified that error appears in the above-identified patent and that said Letters Patent is hereby corrected as shown below:

Column 10
Line 18, "layer" should read -- layers --.

Signed and Sealed this

Twenty-seventh Day of December, 2005

JON W. DUDAS
*Director of the United States Patent and Trademark Office*